United States Patent Office 3,451,821
Patented June 24, 1969

3,451,821
INCREASING THE UTILIZATION OF HOPS AND IMPROVING FLAVOR CONTROL OF MALT BEVERAGES AND THE LIKE
Paul H. Todd, Jr., and Leonard R. Worden, Kalamazoo, Mich., assignors to Kalamazoo Spice Extraction Company, Kalamazoo, Mich., a corporation of Michigan
No Drawing. Filed Mar. 1, 1965, Ser. No. 436,272
Int. Cl. C12c 9/02
U.S. Cl. 99—50.5           15 Claims

ABSTRACT OF THE DISCLOSURE

A process of flavoring a fermented beverage by adding to the wort during the boil the non-volatile non-isomerizable hop extract fraction obtained by extracting hops with an organic solvent and separating therefrom the isomerizable and volatile portions. The isomerizable portion, humulone, may be separated by lead salt precipitation prior to isomerization or isomerized at a pH of 10–11 while present in the fraction. When the humulone is isomerized in the fraction the isohumulone can then be removed by adjusting the pH to 7–8. Lupulone may be removed from the fraction by stirring with water at a pH of at least 9. The isohumulone and essential oils are added to the fermented beverage whereas, the lupulone, when removed, may be added to the beverage during fermentation.

---

The preesnt invention relates to hop flavors, the production thereof, and the utilization thereof in a manner which allows more precise flavor control in the production of malt beverages which conventionally derive their flavor from hop, and is more particularly concerned with separation and utilization in the flavoring of malt beverages of the various fractions which are attainable from the extraction of hops, including isohumulones, hop essential oil, and a so-called nonvolatile nonisomerizable (NVNI) fraction and in some cases even the separation and separate utilization of the several separate fractions which can be derived from the NVNI fraction.

Hops are conventionally used to contribute both bitterness and aroma to malt beverages, e.g., beer or ale, and, over the centuries, certain techniques and practices have developed to give brewers products which are acceptable on the market. In general, this has consisted of adding the hops to the boiling wort at various stages during the boil, for example, a third at the beginning, a third at the middle, and a third toward the end of the boil. Usually the hops with the finest aroma are added last, with the expectation and experience that some of this aroma carries over into the finished beverage. When even more aroma than provided by such procedure is desired in the final beverage, a procedure known as dry-hopping is employed. This consists of adding dry hops to the finished beverage or to the wort after it has been boiled.

It is well known that not all of the flavoring substances indigenous to hops are utilized in the conventional types of procedure mentioned. For example, the isohumulones, which are considered to impart to beer or ale its characteristic bitterness, are obtained from the hops by such procedure in a yield of approximately only 30%, such percentage being based on the amount of known precursors of the isohumulones, viz, the humulones, initially present in hops. The amount of essential hop oil, derived from the hop, which appears in the finished beverage is so small that it has not yet been detected, and is probably considerably less than 1% of the oil originally in the hop. Yet it, too, is very important in giving beer or ale its characteristic flavor.

In order to achieve better utilization of the hop, extracts have also been made and are the subject of various patents and publications. The rationale behind an extract is that the precursors of the bitter substances, namely the humulones, can be removed from the hop with a suitable solvent, and then added to the wort during the boil in such a manner that greater utilization results than when the original hop is used. Claims that a 50% increase in utilization of the hop can be achieved by extraction and use of the extract by addition to the wort have been made, although it has generally been found in practice that this is not the case and that the increase in utilization is in reality of the magnitude of 10% to 25%. This type of hop extract does have the advantage, over use of the hop itself, that it can be stored indefinitely without deterioration and that it takes much less storage space and is much less weighty. Thus it does have certain advantages over the hop even though its efficiency or total hop utilization may not be significantly greater. In another effort to improve utilization of the hop, the hop extract has been isomerized before being added to the wort. It is well known that if humulone is boiled under alkaline conditions, it is converted to isohumulone. Thus, if humulone is separated from a hop extract by any one of the known methods, such as lead salt precipitation, and is then isomerized by boiling under known conditions, such as for three minutes in 0.15 normal sodium hydroxide solution, it is converted to isohumulone. This is the important bittering substance in beer. Likewise, if a total hop extract is treated under similar conditions, the humulone is converted to isohumulone in fair yields, as high as 80%, and it is claimed that greater utilization of the hop can be achieved by either of the foregoing isomerization procedures.

In some of the more recent art, isohumulone is further separated from the isomerized extract and reduced, so as to decrease the tendency toward development of sunstruck flavor in the ultimate beverage flavored therewith. Other workers describe the preparation of a hop extract and its isomerization in boiling alkaline media for certain lengths of time. The water is removed from the isomerized extract under reduced pressure, and the hop essential oil is recovered from the water with which it distills. It has been claimed that up to 80% of the humulone is isomerized to isohumulone by such procedure. The resulting isomerized hop extract, high in isohumulone content, is then added to the wort during the boiling period, and the isohumulone thus distributed throughout the wort. This process is an improvement over the prior art because it does increase the total isomerization of the humulone. According to theory, it should therefore decrease the amount of hop required. However, it is well known that some of the isohumulone is lost by precipitation with the proteins and with the yeast, so that maximum utilization of the hops is not obtained, and in addition variable amounts of isohumulone go into solution during the wort boil, so that batch-to-batch uniformity is not obtained.

Accordingly, the objects of this invention are as follows, namely: To increase the efficiency of the utilization of hops in the flavoring of beer or other malt beverage. To provide a method of carefully controlling the flavor of the finished beer or other malt beverage. To provide a method of modifying and controlling the flavor of the finished beer or other malt beverage in a precise and predictable manner. To provide hop flavors which are highly concentrated and which may be stored under ordinary conditions without deterioration. To accomplish the foregoing ends by utilizing in the flavoring of malt beverages the various portions attainable from the extraction of hops, including isohumulones, hop essential oil, and a so-called nonvolatile nonisomerizable (NVNI) fraction and in some cases even the several separate fractions derivable from the NVNI fraction. Other objects will become apparent hereinafter and still others will be apparent to one skilled in the art.

Briefly, the foregoing objectives are obtained in the following manner:

(A) The hops are extracted with a suitable organic solvent such as benzene, hexane, heptane, or the like, or with solvent mixtures.

(B) The solvent is removed from the extract and, following the removal of the solvent, the essential oil (or volatile oil) of hop is removed from the non-volatile material of the extract, as by steam distillation.

(C) The humulone (or alpha acid) fraction of the hop extract is isomerized, either in the presence of the other parts of the extract or after having been removed from the extract in the form of relatively pure alpha acid.

(D) The isohumulone is removed from the non-isomerizable part of the extract or, if present as relatively pure isohumulone, due to removal of the alpha acid from the extract in the above step, it is further purified and the impurities are returned to the nonvolatile non-isomerizable, non-alpha acid fraction.

(E) The nonvolatile nonisomerizable portion of the extract is added to the wort during the period in which it is normally boiled in the brewing process. The quantity used is calculated to represent material derived from approximately one-third of the quantity of hops which are normally used in the brewing process. The wort is then treated in normal manner, and the fermented beer or ale is introduced into storage under customary conditions.

(F) The isohumulone, usually in a suitable solvent, preferably a stable colloidal solution or suspension of the isohumulone in a solvent such as aqueous propylene glycol, is introduced into the beer as it enters storage or, alternatively, as it is being bottled. The hop essential oil can be introduced in the same solution and at the same time. This oil is ordinarily a careful blend, prepared in bulk, of the vacuum-distilled fractions of the originally steam-distilled hop oil. The blend is prepared in bulk to ensure reproducibility of this important element in the distinction of the flavor and aroma of one brewer's beer from that of another. The addition of isohumulone through a suitable metering device can be controlled precisely and thus the isohumulone level of the finished beer is precisely known. Likewise, the hop essential oil content of the finished beer and the nature of the hop essential oil in the finished beer are precisely known, and thereby precise control of the flavor of the finished beer is achieved. The isohumulone from roughly one-third of the quantity of hops normally used in the brewing process is sufficient to give a beer its normal bittering level, thereby reducing the quantity of hop used in the brewing process by approximately two-thirds.

In its broadest aspects, the invention contemplates the use of not only isohumulone itself but also isohumulone having reduced carbonyl and/or hydrogenated double bonds in the flavoring of the malt beverage as aforesaid, whether in purified form or in the form of a reduced and/or hydrogenated isohumulone fraction or a reduced and/or hydrogenated isomerized humulone fraction.

In a continuous process, this invention offers the only means of obtaining precise and reproducible control of the brewing process, since the nonisomerizable, non-volatile portion of the extract may be measured in with the wort prior to boiling, thereby performing its function as a modifier of yeast growth, and contributing to the biological stability of the beer, while at the same time imparting its own desirable flavor to the finished beverage. The isohumulone and hop essential oil, moreover, can be metered in during the normal flowing of the beer at a later stage in the continuous process.

An example of this invention is as follows, all examples herein being illustrative only and not limiting:

EXAMPLE 1

As background for this purpose of clarification, an abbreviated version of the hop extraction process now follows. The ground hops are extracted with a solvent or solvent mixture such as benzene, hexane, heptane, or the like. The solvent mixture is fractionally distilled to provide recovered solvent and some of the volatile (hop essential oil) portion of the extract as one fraction of the extract. The undistilled material (micella) is heated in a basic aqueous medium. The remainder of the volatile (hop essential oil) friction steam distills and is isolated during this operation and is combined with any recovered earlier. The hot, basic medium causes isomerization of everything which will isomerize. The isomerized product is more acidic than its precursor. The pH of the cooled, isomerized reaction mixture is lowered from 10–11 to 7–8 at which point the aqueous solution containing dissolved isomerized material (including such isohumulone) is separated as a second fraction from black tars (nonvolatile, nonisomerizable—"NVNI"—materials). From now on this crude, nonvolatile and nonisomerizable tar will be referred to as the NVNI fraction, which is the third fraction separated from the hop extraction. Of course, "nonvolatile" and "nonisomerizable" are relative terms and as used herein are used only with reference to the conditions to which the hop extract is subjected for this determination, namely: a hot basic aqueous medium of pH 10–11.

If one wishes to isolate lupulone from the NVNI fraction, the NVNI fraction may then be stirred with water at a pH of at least 9, preferably pH 11–12. This gives black tars and an aqueous solution containing crude (ca. 70%) lupulone. The tars are separated and the aqueous solution worked up to provide crude lupulone.

A detailed description of a representative hop extraction process follows:

Representative example of a hop extraction process involving removal of volatile hop oils, followed by isomerization and isolation of the nonvolatile-nonisomerizable (NVNI) fraction:

(A) Fresh hops (1000 g.) were dried, ground, and exhaustively extracted with hexane. Removal of the solvent by distillation provided a concentrated micella, which was steam-distilled to provide a series of hop oil fractions.

(B) Water was added to the residue from the steam distillation in A to bring the total volume to ca. 2 liters. The pH was adjusted to 10–11 with a phosphate buffer and the solution was kept at a temperature between 89 and 97° C. for 30–90 minutes and then poured into sufficient cold 5% hydrochloric acid to lower the pH to 6.4. The precipitated nonvolatile, nonisomerizable (NVNI) fraction was isolated by extraction with hexane and then removal of the solvent by distillation.

Comments (A)

(1) Hops do not have to be fresh, dried, or ground.
(2) Prior art shows solvent can also be most organic solvents, e.g., ethanol, halogenated hydrocarbons, other hydrocarbon, e.g., heptane, benzene, ether, acetone, methanol.

(B)

(1) pH not limited to 10–11. May be pH of 9–13.
(2) Phosphate not limiting. Use any base: NaOH, $NaHCO_3$, $Na_2CO_3$, etc.
(3) Temperature and time not limiting. Lower temperature means longer reaction period. Higher temperature, shorter period.
(4) May be acidified with any water-soluble acid, e.g., $H_2SO_4$.
(5) pH of 6.4 is not limiting. May be 3–9 depending on what solvent is used. Hexane is not limiting. Solvent is limited of course to a water-immiscible solvent.

Three products are thus obtained, namely, the volatile essential oil which can be fractioned and blended into various different aromatic flavors, if desired, or used as such; the nonvolatile nonisomerizable extract; and the isohumulone. If desired, the lupulone can be removed from the NVNI fraction as indicated previously.

In normal brewing practice in the United States at this time, that is, with addition of whole hops to the boiling wort, 100 pounds of hops would be sufficient to flavor 300 barrels of beer. If all of the above crude extract containing the alpha acids, the nonisomerizable materials, and the volatile oils could be utilized efficiently, approximately 900 to 1000 barrels of beer could be flavored.

According to the efficient procedure of the present invention, the nonisomerizable, nonvolatile portion of the extract can be added to sufficient wort to make 900 or more barrels of beer, and the isohumulone and hop essential oil derived from the hop will be sufficient for 900 or more barrels of beer.

The process of making this beer is as follows:

EXAMPLE 2

The nonisomerizable, nonvolatile extract is added to the wort during the boil. The wort is handled in the normal batch or continuous process, and properly fermented. The beer is then aged and, when it is being pumped into the filling line, a solution of hop oil and isohumulone in a suitable solvent is metered into the beer. The solution of isohumulone and hop oil is added at and to such a level as to give the desired oil and isohumulone content to the finished beer. Twenty parts per million of isohumulone is usually adequate. Alternatively, if it is desired to "age" out the oils and isohumulones in the beer, they may be metered into the beer as it is being pumped into the aging tanks prior to storage. Sufficient material is available from 100 pounds of hops to flavor approximately 900 barrels of beer.

In the above example, fresh hops were used, but it is well known that hops which have been stored for a number of months deteriorate both in flavor quality and flavor intensity. This means that a brewer who uses hops per se is unable to keep his flavor uniform throughout the period between hop harvest and the next hop harvest, due to the slight and continuing changes which occur in the hops. However, by extracting the hops soon after they are harvested, a flavor which is unaffected by aging of the hops and which remains uniform throughout the season is obtained. In addition, the flavor quality from the hops is not lost due to oxidation or polymerization. Thus the flavor yield remains constant throughout the year, rather than diminishing as it is known to do.

In addition, the problem of differences in humulone and essential hop oil content of various lots of hops is eliminated, because the isohumulone is metered into the beer at and to a controlled level, and the essential hop oil is metered into the beer at and to a controlled level, and the ultimate flavor is thus no longer dependent upon the original level of the alpha acids or humulones in the hops.

One of the most unique features of this invention resides in the addition of the nonisomerizable, nonvolatile portion of the hop extract during the wort boiling period. This is based on the observation that such is necessary if the beer is to have the most desirable full-bodied and properly controlled flavor. Although the reason why this is necessary has not yet been concretely established, this NVNI portion of the hop extract undoubtedly fulfills at least three functions. These are: (1) Control of yeast metabolism and effect upon flavor bodies produced by yeast metabolism, (2) Control of bacterial infections, and (3) Breakdown of constituents of this nonisomerizable nonvolatile portion of the hop extract during the fermentation process to produce additional flavor bodies. If this nonisomerizable, nonvolatile portion of the extract is not included in the fermentation process, a less-palatable beer is obtained. Prior art practice has failed to recognize or acknowledge this fact and has discarded the NVNI fraction or at least omitted it from the brew or beverage product after its separation out of the hop extract.

As is readily apparent, the control of isohumulone level and hop essential oil level in the finished beer by use of this process is precise, and this control is another area where extracts or isomerized extracts such as suggested in the prior art fail. In addition, it is apparent from the above example that the yield of flavor from the hop is approximately three times as great as that obtained by the prior art.

As another example of the process, the following can be given:

EXAMPLE 3

100 pounds of hops are extracted with a suitable solvent, such as benzene. The benzene extract is subjected to lead salt precipitation, by any of the methods of the prior art. This removes the alpha acids from the extract. The alpha acids are isomerized, and the resulting isohumulone is held for addition to the beer. The remainder of the benzene extract is subjected to a steam distillation, which removes the essential oil of hop. The volatile oil steam-distillate is distilled in vacuo into a number of fractions. These fractions may be blended in ratios relative to the particular oil flavor desired by the individual brewer for subsequent addition to the beer. The residue, consisting of the nonisomerizable, nonvolatile portion of the extract (nonisomerizable at pH 10–11 in hot aqueous basic medium), is held as a separate entity. Each of these portions is used in brewing a beer as follows:

The nonisomerizable nonvolatile portion of the extract boilis added to 900 barrels of wort at the beginning of the boil. The isohumulone and oil are metered into the beer after fermentation, either before or after storage and at a controlled and predetermined level.

A variation on this example involves removing the benzene, hexane, or other suitable solvent from the extracted hops with steam, preferably under reduced pressure, and then making an extract of the spent hops with an 80% ethanolic or other water-miscible solvent. This removes the tannins from the hops, which may be recovered by removal of the solvent and water. However, they may or may not be desirable, depending on the particular type of beer being made, and their incorporation into the beer is not considered essential to this invention. It is merely optional. The use of the tannins does not involve an additional step in the brewing process, since they may be mixed with the nonvolatile, nonisomerizable portion and added at the same time, if desired.

A second variant on this process is to use a portion of the hops normally used at the early stages of the wort boil, and to use the process disclosed herein to provide the flavor of the more expensive hops used toward the end of the wort boil. This modification will be advantageous when hops of poor quality, but adequate for addition early in the boil, are very inexpensive. It also will control "late boil," a problem encountered by some brewers.

A third variant on this process is to remove the lupulone from the nonvolatile, nonisomerizable portion of the extract, and to add it as desired during the fermentation process. This may be effected by stirring the NVNI fraction with a mixture of water and an organic solvent such as benzene, hexane, heptane, or the like, at a pH exceeding 9, preferably 11–12, removing the tars in solution in the organic solvent, and similarly extracting the lupulone in solution in the aqueous phase in the same or a similar volatile organic solvent at a pH of 8; the crude lupulone is freed from solvent by distillation. It is well known that lupulone is bactericidal in action, and that it does not survive the wort boil period and appear in the fermentation process. By separation and controlled addition to the beer or other malt beverage during fermentation, bacterial infections can be reduced.

In this specification, as is common in the art, the terms isohumulone, dihydroisohumulone, tetrahydroisohumulone, and hexahydroisohumulone are used to represent closely related families of compounds rather than individual molecular structures. For example, in each of these structures, there is a group —CO—R. When the R in the isohumulone structure is —$CH_2$—$CH(CH_3)_2$, the isohumulone compound is named isohumulone. When R in this structure is —$CH(CH_3)$—$CH_2CH_3$, the isohumulone compound is named isoadhumulone. When R is —$CH(CH_3)_2$, the compound is named isocohumulone. The compounds generally exist in admixture. In addition, the names given include all possible optical isomers and mixtures of stereoisomers. The dihydro-, tetrahydro-, and hexahydroisohumulones have a reduced carbonyl group, two hydrogenated ethylene groups, and two hydrogenated ethylene groups and a reduced carbonyl group, respectively. When used in the claims hereof in connection with the flavoring of a beverage, the term "isohumulone" includes not only use of isohumulones per se but also isohumulones which have been treated to reduce carbonyl and/or hydrogenate ethylene groups.

The flavoring materials of the present invention, especially when in pure or substantially pure form, find application not only in the flavoring of fermented beverages, such as malt beverages, e.g., beer or ale, but also in the flavoring of nonfermented and nonmalt beverages, for example imitation malt beverages, e.g., "near-beer," "root-beer," or any other beverage in which a hop or hop-like flavor is desired, either alone or in combination with other flavor ingredients.

Various modifications and equivalents will be apparent to one skilled in the art and may be made in the compounds, compositions, methods, and procedures of the present invention without departing from the spirit or scope thereof, and it is therefore to be understood that the invention is to be limited only by the full scope which can be legally attributed to the appended claims.

We claim:

1. A process of flavoring a fermented beverage comprising the step of adding to the wort during the boil the nonvolatile non-isomerizable hop extract fraction which is obtained by extracting hops with an organic solvent and then removing from said extract the isomerizable materials and volatile portions.

2. A process of flavoring a fermented beverage comprising the step of adding to the wort during the boil the nonvolatile nonisomerizable hop extract fraction, which is obtained by extracting hops with an organic solvent and then removing from said extract the isomerizable materials and volatile portions, from which lupulone has been removed.

3. A process of flavoring a fermented beverage comprising the steps of adding to the wort during the boil the nonvolatile nonisomerizable hop extract fraction, which is obtained by extracting hops with an organic solvent and then removing from said extract the isomerizable materials and volatile portions, from which lupulone has been removed, and adding lupulone to the beverage during fermentation.

4. The method of brewing comprised of extracting the hops, isomerizing the humulones present in the hop extract and isolating the essential hop oil, separating the isohumulone from the nonvolatile nonisomerizable fraction, recovering the fraction which is nonvolatile and nonisomerizable when subjected to hot aqueous basic medium at pH 10–11, and utilizing the various hop extract fractions in the brewing of a fermented beverage by adding the nonvolatile nonisomerizable fraction to the wort during the the boil and adding the isohumulone and hop essential oil to the beverage after fermentation.

5. The method of brewing comprised of extracting the hops, separating the essential hop oil from the nonvolatile fraction, separating the humulones from the hop extract and isomerizing the same to produce isohumulone, recovering the fraction which is nonvolatile and nonisomerizable when subjected to hot aqueous basic medium at pH 10–11, and utilizing the various hop extract fractions in the brewing of a fermented beverage by adding the nonvolatile nonisomerizable fraction to the wort during the boil and adding the isohumulone and hop essential oil to the beverage after fermentation.

6. The method of claim 4, wherein organic solvent is removed from the hop extract and essential oil removed from the residue by steam distillation, and the nonvolatile portion of the extract heated in aqueous phase at an alkaline pH to isomerize humulones therein, the thus-produced isohumulone separated from the nonvolatile nonisomerizable fraction by extraction, and the various hop extract fractions utilized in the brewing of a fermented beverage by adding the nonvolatile nonisomerizable fraction to the wort during the boil and adding the isohumulone and hop essential oil to the beverage after fermentation.

7. The method of claim 5 wherein organic solvent is removed from the hop extract and essential oil removed from the residue by stream distillation, the humulones separated from the residue by extraction and heated in aqueous phase at an alkaline pH to isomerize same to isohumulone, the nonvolatile nonisomerizable fraction separated, and the various hop extract fractions utilized in the brewing of a fermented beverage by adding the nonvolatile nonisomerizable fraction to the wort during the boil and adding the isohumulone and hop essential oil to the beverage after fermentation.

8. The method of brewing comprised of the steps of extracting the hops, isomerizing the humulones present in the hop extract and isolating the essential hop oil, separating the isohumulone from the nonvolatile nonisomerizable fraction, recovering the fraction which is nonvolatile and nonisomerizable when subjected to hot aqueous basic medium at pH 10–11, removing lupulone from the nonvolatile nonisomerizable fraction, and utilizing the various hop extract fractions in the brewing of a fermented beverage by adding the nonvolatile nonisomerizable fraction to the wort during the boil and adding the isohumulone and hop essential oil to the beverage after fermentation.

9. The method of brewing comprised of the steps of extracting the hops, separating the essential hop oil from the nonvolatile fraction, separating the humulones from the hop extract and isomerizing the same to produce isohumulone, recovering the fraction which is nonvolatile and nonisomerizable when subjected to hot aqueous basic medium at pH 10–11, removing lupulone from the nonvolatile nonisomerizable fraction, and utilizing the various hop extract fractions in the brewing of a fermented beverage by adding the nonvolatile nonisomerizable fraction to the wort during the boil and adding the isohumulone and hop essential oil to the beverage after fermentation.

10. The method of claim 8 wherein organic solvent is removed from the hop extract and essential oil removed from the residue by steam distillation, and the nonvolatile portion of the extract heated in aqueous phase at an alkaline pH to isomerize humulones therein, the thus-produced isohumulone separated from the nonvolatile nonisomerizable fraction by extraction, lupulone removed from the nonvolatile nonisomerizable fraction, and the various hop extract fractions utilized in the brewing of a fermented beverage by adding the nonvolatile nonisomerizable fraction to the wort during the boil and adding the isohumulone and hop essential oil to the beverage after fermentation.

11. The method of claim 9 wherein organic solvent is removed from the hop extract and essential oil removed from the residue by steam distillation, the humulones separated from the residue by extraction and heated in aqueous phase at an alkaline pH to isomerize same to isohumulone, the nonvolatile nonisomerizable fraction separated, lupulone removed from the nonvolatile nonisomerizable fraction, and the various hop extract fractions utilized in the brewing of a fermented beverage by adding the nonvolatile nonisomerizable fraction to the wort during the boil and adding the isohumulone and hop essential oil to the beverage after fermentation.

12. The process of claim 8, wherein lupulone is added to the beverage during fermentation.

13. The process of claim 9, wherein lupulone is added to the beverage during fermentation.

14. The process of claim 10, wherein lupulone is added to the beverage during fermentation.

15. The process of claim 11, wherein lupulone is added to the beverage during fermentation.

References Cited

UNITED STATES PATENTS

| 3,155,522 | 11/1964 | Hildebrand et al. | 99—50.5 |
| 3,298,835 | 1/1967 | Hildebrand et al. | 99—50.5 |
| 3,354,219 | 11/1967 | Rigby | 99—50.5 |

FOREIGN PATENTS

| 235,788 | 8/1960 | Australia. |
| 619,563 | 5/1961 | Canada. |

A. LOUIS MONACELL, *Primary Examiner.*

N. ROSKIN, *Assistant Examiner.*